(12) United States Patent
Da et al.

(10) Patent No.: US 11,201,715 B2
(45) Date of Patent: Dec. 14, 2021

(54) MEASUREMENT METHOD AND DEVICE

(71) Applicant: DATANG MOBILE COMMUNICATIONS EQUIPMENT CO., LTD., Beijing (CN)

(72) Inventors: Ren Da, Beijing (CN); Bin Ren, Beijing (CN); Haiyang Quan, Beijing (CN); Hui Li, Beijing (CN); Xueyuan Gao, Beijing (CN); Qiubin Gao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 17/275,660

(22) PCT Filed: Sep. 4, 2019

(86) PCT No.: PCT/CN2019/104419
§ 371 (c)(1),
(2) Date: Mar. 11, 2021

(87) PCT Pub. No.: WO2020/063286
PCT Pub. Date: Apr. 2, 2020

(65) Prior Publication Data
US 2021/0328747 A1 Oct. 21, 2021

(30) Foreign Application Priority Data
Sep. 26, 2018 (CN) .......................... 201811126838.X

(51) Int. Cl.
*H04L 5/00* (2006.01)
*G01S 5/14* (2006.01)
*H04W 24/08* (2009.01)

(52) U.S. Cl.
CPC .............. *H04L 5/0058* (2013.01); *G01S 5/14* (2013.01); *H04W 24/08* (2013.01)

(58) Field of Classification Search
CPC ......... H04L 5/0058; G01S 5/14; H04W 24/08
See application file for complete search history.

(56) References Cited

U.S. PATENT DOCUMENTS

| 2014/0162704 A1 | 6/2014 | Choi et al. |
| 2016/0195601 A1 | 7/2016 | Siomina et al. |

(Continued)

FOREIGN PATENT DOCUMENTS

| CN | 103200610 A | 7/2013 |
| CN | 103856894 A | 6/2014 |

(Continued)

OTHER PUBLICATIONS

ETSI MCC,"Report of 3GPP TSG RAN2#102 meeting, Busan, Korea",3GPP TSG-RAN WG2 meeting #103, Gothenburg, Sweden, Aug. 20-24, 2018, total 296 pages, R2-1811001.

*Primary Examiner* — Wayne H Cai
(74) *Attorney, Agent, or Firm* — Kilpatrick Townsend & Stockton, LLP

(57) ABSTRACT

The present application relates to the field of wireless communications, in particular, to a measurement method and device, used for solving the problem in the art that there is no specific solution for a terminal to perform OTDOA measurement in a NR system. In embodiments of the present application, a terminal determines a detected first beam reference signal, and sends a request message to an LMF entity, receive first positioning assistance data comprising second beam information of a second beam reference signal sent by the LMF entity, measure the second beam reference signal of an adjacent base station according to the first positioning assistance data. Therefore, it is ensured that the LMF entity can accurately provide the positioning assistance (Continued)

data to a UE according to first beam information of the first beam reference signal, the time and power consumption of the terminal for searching the second beam reference signal are reduced, and the system performance is further improved.

19 Claims, 7 Drawing Sheets

(56) References Cited

U.S. PATENT DOCUMENTS

| | | |
|---|---|---|
| 2017/0026799 A1 | 1/2017 | Sampath et al. |
| 2019/0166452 A1* | 5/2019 | Tenny .................... H04W 4/02 |
| 2021/0126726 A1* | 4/2021 | Parkvall ............... H04B 7/0452 |
| 2021/0219104 A1* | 7/2021 | Chen .................... H04L 5/0094 |

FOREIGN PATENT DOCUMENTS

| | | |
|---|---|---|
| CN | 107852582 A | 3/2018 |
| CN | 107925496 A | 4/2018 |
| CN | 108064056 A | 5/2018 |
| WO | 2015027118 A1 | 2/2015 |
| WO | 2017164925 A1 | 9/2017 |
| WO | 2018144146 A1 | 8/2018 |

\* cited by examiner

MEASUREMENT METHOD AND DEVICE

The present application is a national phase entry under 35 U.S.C. § 371 of International Application No. PCT/CN2019/104419, filed on Sep. 4, 2019, which claims the priority from Chinese Patent Application No. 201811126838.X, filed with the China National Intellectual Property Administration on Sep. 26, 2018 and entitled "Measurement Method and Device", which is hereby incorporated by reference in its entirety.

FIELD

The present application relates to the field of wireless communication technologies and particularly to a measurement method and device.

BACKGROUND

The Observed Time Difference of Arrival (OTDOA) positioning is a positioning method defined by the 3GPP protocol specification. The basic principle of the OTDOA is: a User Equipment (UE) measures downlink reference signals sent from multiple Transmission Points (TPs) to obtain the Reference Signal Time Difference (RSTD) measurement to the UE, and reports the RSTD measurements to the positioning server to locate the position of the UE.

In the OTDOA positioning process, the positioning server needs to obtain the OTDOA assistance information associated with the cell (e.g., the physical cell ID, the antenna position of the cell, and the PRS configuration, etc.) from a Base Station (BS) through the positioning protocol specified by the 3GPP. Then, the UE obtains the OTDOA assistance information for supporting the RSTD measurement from the positioning server through the positioning protocol specified by the 3GPP; and the UE performs the OTDOA measurement according to the OTDOA assistance information to obtain the RSTD measurements. However, the NR (5G New Radio) system is a multi-beam signal transmission system, and the existing method of the UE to perform the OTDOA measurement cannot be directly applied to the NR system.

To sum up, there is no specific solution for the terminal to perform the OTDOA measurement in the current NR system.

SUMMARY

The application provides a measurement method and device, to solve the problem in the prior art that there is no specific solution for the terminal to perform the OTDOA measurement in the NR system.

Based on the foregoing problem, in a first aspect, an embodiment of the present application provides a measurement method. The method includes: determining, by a terminal, a first beam reference signal detected by said terminal, and sending a request message to a Location Management Function (LMF) entity, where the request message contains first beam information of the first beam reference signal, to allow the LMF entity to determine second beam information of second beam reference signals according to the first beam information, the second beam reference signals being sent from adjacent base stations and detectable by the terminal; receiving, by the terminal, first positioning assistance data containing the second beam information sent by the LMF entity; and measuring, by the terminal, the second beam reference signals from the adjacent base stations according to the first positioning assistance data.

In one embodiment, the first beam reference signal is a beam communication Reference Signal (DL-RS) used to support data communication and/or a beam Positioning Reference Signal (PRS) used to support positioning; and the second beam reference signals each is a PRS used to support positioning.

In one embodiment, the first beam information includes a part or all of: a DL-RS beam identifier, DL-RS signal strength, a PRS beam identifier.

In one embodiment, the second beam information includes a PRS beam identifier.

In one embodiment, after the terminal measures the second beam reference signals of the adjacent base stations according to the first positioning assistance data, the method further includes: determining, by the terminal, positioning information obtained by measurements; and sending, by the terminal, the positioning information and the second beam information of the second beam reference signals used for measurement to the LMF entity, to allow the LMF entity to determine a position of the terminal according to the positioning information and the second beam information of the second beam reference signals used for measurement.

In one embodiment, determining, by the terminal, a first beam reference signal detected by itself, includes: determining, by the terminal, the first beam reference signal detected by itself when it needs to acquire the first positioning assistance data.

In one embodiment, after the terminal receives the first positioning assistance data containing the second beam information of the second beam reference signals sent by the LMF entity, and before the terminal measures the second beam reference signals of the adjacent base stations according to the first positioning assistance data, the method further includes: receiving, by the terminal, a positioning request message sent by the LMF entity.

In a second aspect, an embodiment of the present application provides a measurement method. The method includes: receiving, by an LMF entity, a request message sent by a terminal; where the request message contains first beam information of a first beam reference signal detected by the terminal; determining, by the LMF entity, second beam information of second beam reference signals according to the first beam information, the second beam reference signals being sent from adjacent base stations and detectable by the terminal; and sending, by the LMF entity, first positioning assistance data containing the second beam information to the terminal, to allow the terminal to measure the second beam reference signals from the adjacent base stations according to the first positioning assistance data.

In one embodiment, after the LMF entity sends the first positioning assistance data containing the second beam information to the terminal, the method further includes: receiving, by the LMF entity, positioning information sent from the terminal, and determining a position of the terminal according to the positioning information; where the positioning information is obtained by the terminal through measuring the second beam reference signals from the adjacent base stations according to the first positioning assistance data.

In one embodiment, before the LMF entity determines the second beam reference signals sent by the adjacent base stations and detectable by the terminal, the method further includes: receiving, by the LMF entity, second positioning assistance data reported by each base station and contains third beam information of a third beam reference signal sent by each base station.

In one embodiment, determining, by the LMF entity, second beam information of second beam reference signals sent by adjacent base stations and detectable by the terminal, includes: determining, by the LMF entity, the second beam information of the second beam reference signals sent by the adjacent base stations and detectable by the terminal according to the first beam information of the first beam reference signal detected by the terminal contained in the request message and the second positioning assistance data.

In one embodiment, the first beam reference signal is a beam communication Reference Signal (DL-RS) used to support data communication and/or a beam PRS used to support positioning; and the second beam reference signals each is a beam PRS used to support positioning.

In one embodiment, the third beam reference signal is a DL-RS used to support data communication and/or a PRS used to support positioning.

In one embodiment, the first beam information includes a part or all of: a DL-RS beam identifier, DL-RS signal strength, a PRS beam identifier.

In one embodiment, the second beam information includes a PRS beam identifier.

In one embodiment, the third beam information includes a part or all of: a PRS beam identifier, a PRS beam direction, a PRS beam width, a DL-RS beam identifier, a DL-RS beam direction, a DL-RS beam width, and a QCL association relationship between DL-RS beam and PRS beam.

In one embodiment, the method further includes: receiving, by the LMF entity, the second beam information of the second beam reference signals used for measurement sent by the terminal; and determining, by the LMF entity, a position of the terminal according to the positioning information, includes: determining, by the LMF entity, the position of the terminal according to the positioning information and the second beam information of the second beam reference signals used for measurement.

In a third aspect, an embodiment of the present application provides a terminal. The terminal includes: a processor, a memory and a transceiver. The processor is configured to read a program in the memory and perform: determining a first beam reference signal detected by said terminal, and sending a request message to a Location Management Function, LMF, entity, and the request message contains first beam information of the first beam reference signal, to allow the LMF entity to determine second beam information of second beam reference signals according to the first beam information, the second beam reference signals being sent from adjacent base stations and detectable by the terminal; receiving first positioning assistance data containing the second beam information sent by the LMF entity; and measuring the second beam reference signals from the adjacent base stations according to the first positioning assistance data.

In one embodiment, the first beam reference signal is a beam communication Reference Signal (DL-RS) used to support data communication and/or a beam PRS used to support positioning; and the second beam reference signals each is a PRS used to support positioning.

In one embodiment, the first beam information includes a part or all of: a DL-RS beam identifier, DL-RS signal strength, a PRS beam identifier.

In one embodiment, the second beam information includes a PRS beam identifier.

In one embodiment, the processor is further configured to perform: determining positioning information obtained by measurements after measuring the second beam reference signals of the adjacent base stations according to the first positioning assistance data; and sending the positioning information and the second beam information of the second beam reference signals used for measurement to the LMF entity, to allow the LMF entity determines a position of the terminal according to the positioning information and the second beam information of the second beam reference signals used for measurement.

In one embodiment, the processor is configured to perform: determining the first beam reference signal detected by itself when it needs to acquire the first positioning assistance data.

In one embodiment, the processor is further configured to perform: receiving a positioning request message sent by the LMF entity after receiving the first positioning assistance data containing the second beam information of the second beam reference signals sent by the LMF entity and before measuring the second beam reference signals from the adjacent base stations according to the first positioning assistance data.

In a fourth aspect, an embodiment of the present application provides an LMF entity. The LMF entity includes: a processor, a memory and a transceiver. The processor is configured to read a program in the memory and perform: receiving a request message sent by a terminal; where the request message contains first beam information of a first beam reference signal detected by the terminal; determining second beam information of second beam reference signals according to the first beam information, the second beam reference signals being sent from adjacent base stations and detectable by the terminal; and sending first positioning assistance data containing the second beam information to the terminal, to allow the terminal to measure the second beam reference signals of the adjacent base stations according to the first positioning assistance data.

In one embodiment, the processor is further configured to perform: receiving positioning information sent by the terminal, and determining a position of the terminal according to the positioning information; where the positioning information is obtained by the terminal through measuring the second beam reference signals of the adjacent base stations according to the first positioning assistance data.

In one embodiment, the processor is further configured to perform: receiving second positioning assistance data reported by each base station and contains third beam information of a third beam reference signal sent by each base station before determining the second beam reference signals sent by the adjacent base stations and detectable by the terminal.

In one embodiment, the processor is configured to perform: determining the second beam information of the second beam reference signals sent by the adjacent base stations and detectable by the terminal according to the first beam information of the first beam reference signal detected by the terminal contained in the request message and the second positioning assistance data.

In one embodiment, the first beam reference signal is a beam communication Reference Signal (DL-RS) used to support data communication and/or a beam Positioning Reference Signal (PRS) used to support positioning; and the second beam reference signals each is a PRS used to support positioning.

In one embodiment, the third beam reference signal is a DL-RS used to support data communication and/or a PRS used to support positioning.

In one embodiment, the first beam information includes a part or all of: a DL-RS beam identifier, DL-RS signal strength, a PRS beam identifier.

In one embodiment, the second beam information includes a PRS beam identifier.

In one embodiment, the third beam information includes a part or all of: a PRS beam identifier, a PRS beam direction, a PRS beam width, a DL-RS beam identifier, a DL-RS beam direction, a DL-RS beam width, and a QCL association relationship between DL-RS beam and PRS beam.

In one embodiment, the processor is further configured to perform: receiving the second beam information of the second beam reference signals used for measurement sent by the terminal; and the processor is configured to perform: determining the position of the terminal according to the positioning information and the second beam information of the second beam reference signals used for measurement.

In a fifth aspect, an embodiment of the present application further provides a terminal. The terminal includes: a first sending device configured for determining a first beam reference signal detected by said terminal, and sending a request message to a Location Management Function, LMF, entity, and the request message contains first beam information of the first beam reference signal, to allow the LMF entity to determine second beam information of second beam reference signals according to the first beam information, the second beam reference signals being sent from adjacent base stations and detectable by the terminal; a first receiving device configured for receiving first positioning assistance data containing the second beam information sent by the LMF entity; and a measurement device configured for measuring the second beam reference signals of the adjacent base stations according to the first positioning assistance data.

In a sixth aspect, an embodiment of the present application further provides an LMF entity. The LMF entity includes: a second receiving device configured for receiving a request message sent by a terminal; where the request message contains first beam information of a first beam reference signal detected by the terminal; a determining device configured for determining second beam information of second beam reference signals according to the first beam information, the second beam reference signals being sent from adjacent base stations and detectable by the terminal; and a second sending device configured for sending first positioning assistance data containing the second beam information to the terminal, to allow the terminal to measure the second beam reference signals from the adjacent base stations according to the first positioning assistance data.

In a seventh aspect, an embodiment of the present application provides a computer storable medium storing a computer program thereon, where the program, when executed by a processor, implements the operations of the method described in the above first aspect or implements the operations of the method described in the above second aspect.

In the embodiments of the present application, the terminal determines the first beam reference signal detected by itself and sends the request message containing the first beam information of the first beam reference signal to the LMF entity, the LMF entity determines the second beam reference signals sent by the adjacent base stations that can be detected by the terminal, and the terminal receives the second beam information of the second beam reference signals contained in the first positioning assistance data sent by the LMF entity, so that the terminal can perform the OTDOA measurements according to the first positioning assistance data, to ensure that the LMF entity can accurately provide the positioning assistance data to the UE according to the first beam information of the first beam reference signal. Further, since the first positioning assistance data contains the second beam information of the second beam reference signal, the terminal can detect the beam reference signal quickly according to the second beam information, reducing the time and power consumption of the terminal to search for the second beam reference signal, and further improving the system performance.

DETAILED DESCRIPTION OF THE EMBODIMENTS

Figure 1:
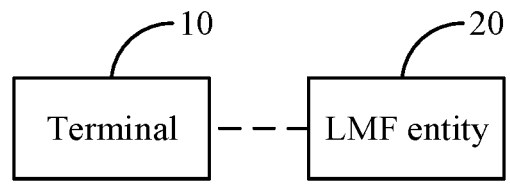
FIG. 1 is a structural schematic diagram of a system for measurement and positioning according to embodiments of the present application.

In the following, some terms in the embodiments of the present application are explained to facilitate the understanding.

(1) In the embodiments of the present application, the nouns "network" and "system" are often used alternately.

(2) The term "a plurality of" in the embodiments of the present application refers to two or more, and other quantifiers are similar thereto.

(3) "and/or" describes the association relationship of the associated objects, and indicates that there may be three relationships, for example, A and/or B may represent: only A, both A and B, and only B. The character "I" generally indicates that the associated objects have a kind of "or" relationship.

The network architectures and service scenarios described in the embodiments of the present application are intended to illustrate the embodiments of the present application more clearly, and do not constitute a limitation on the embodiments of the present application. With the evolution of network architectures and the emergence of new service scenarios, the embodiments of the present application are also applicable to similar problems.

Here, the terminal device is a device with the wireless communication function, and can be deployed on land, including indoor or outdoor, handheld or vehicle-mounted; or can also be deployed on the water (such as ship, etc.); or can also be deployed in the air (e.g., on the airplane, balloon and satellite, etc.). The terminal device may be: mobile phone, Pad, computer with wireless transceiver function, Virtual Reality (VR) terminal device, Augmented Reality (AR) terminal device, wireless terminal device in the industrial control, wireless terminal device in the self driving, wireless terminal device in the remote medical, wireless terminal device in the smart grid, wireless terminal device in the transportation safety, wireless terminal device in the smart city, wireless terminal device in the smart home, etc.; or may be various forms of UE, Mobile Station (MS), terminal device.

The network-side device is a device that provides the wireless communication function for the terminal device, including but not limited to: gNB in 5G, Radio Network Controller (RNC), Node B (NB), Base Station Controller (BSC), Base Transceiver Station (BTS), home base station (for example, home evolved NodeB or Home Node B (HNB)), Base Band Unit (BBU), Transmission and Reception Point (TRP), Transmitting Point (TP), mobile switching center, etc. The base station in the present application may also be a device that provides the wireless communication function for the terminal device in other communication systems that may appear in the future.

The measurement method given in the embodiments of the present application is applicable to an NR system that uses multiple beams for transmitting signals. The NR system supports the transmission of multiple signal beams in different directions in all frequency ranges. For example, the protocol stipulates that a Synchronization Signal block (SSB) burst can contain up to L SSBs (L=4 in the frequency band below 3 GHz, L=8 in the frequency band between 3 GHz and 6 GHz, L=64 in the frequency band above 6 GHz), and the transmission beam directions of the SSBs are generally different.

The OTDOA assistance information exchanged currently among the terminal, the positioning server and the base station does not contain the information related to the downlink reference signal beam, e.g., beam identification, beam direction, beam width, etc. After receiving the OTDOA assistance information that does not contain the beam-related information, the terminal cannot search for the downlink reference signal accurately, increasing the time and power consumption for the terminal to search for the downlink reference signal.

The present application will be further illustrated below in details with reference to the accompanying figures. The described embodiments are merely a part of the embodiments of the present application but not all the embodiments. Based upon the embodiments of the present application.

As shown in FIG. 1, a measurement system of an embodiment of the present application includes: a terminal 10 and an LMF entity 20.

The terminal 10 is configured to: determine a first beam reference signal detected by itself, and send a request message to a Location Management Function (LMF) entity. The request message contains the first beam information of the first beam reference signal, to allow the LMF entity to determine the second beam information of second beam reference signals sent by adjacent base stations that can be detected by the terminal according to the first beam information. The terminal is further configured to receive the first positioning assistance data containing the second beam information sent by the LMF entity, and measure the second beam reference signals of the adjacent base stations according to the first positioning assistance data.

The LMF entity 20 is configured to: receive a request message sent by a terminal; and the request message contains the first beam information of a first beam reference signal detected by the terminal; determine the second beam information of second beam reference signals sent by adjacent base stations that can be detected by the terminal according to the first beam information; and send the first positioning assistance data containing the second beam information to the terminal, to allow the terminal to measure the second beam reference signals of the adjacent base stations according to the first positioning assistance data.

The terminal in the RRC connected (RRC CONNECTED) state needs to periodically measure the first beam reference signal from the serving base station and adjacent base station, e.g., perform the Radio Resource Management (RRM) measurement, or perform the Beam Management (BM) measurement.

Here, the first beam reference signal may be a Downlink Reference Signal (DL-RS) used to support data communication and/or a Positioning Reference Signal (PRS) used to support positioning; and the first beam information includes some or all of: DL-RS beam identifier, DL-RS signal strength, PRS beam identifier.

It should be noted here that the DL-RS beam identifier is the SSB index or Channel State Indication Reference Signal (CSI-RS) index detected by the UE during the BM/RRM measurement; the DL-RS signal strength is a measured value of the Reference Signal Receiving Power (RSRP) obtained by the UE during the BM/RRM measurement; and the PRS beam identifier is the identifier of the beam where the UE has detected the PRS previously or currently.

If the terminal performs the periodic RRM measurement on the first beam reference signal, it can obtain the first beam reference signal and the signal strength of the first beam reference signal; after detecting the first beam reference signal, the terminal sends a request message to the LMF entity to request the positioning assistance data from the LMF entity. Here the request message sent by the terminal to the LMF entity contains the first beam information of the first beam reference signal.

It should be noted that the request message sent by the terminal to the LMF entity also contains other information which is the same as that in the prior art. The details can refer to the information in the request message sent by the terminal to the positioning server in the prior art, and will not be repeated here.

In one embodiment, the terminal determines the first beam reference signal detected by itself at the following moment: the terminal determines the first beam reference signal detected by itself when it needs to acquire the first positioning assistance data.

Furthermore, the LMF entity receives the second positioning assistance data that is reported by each base station and contains the third beam information of a third beam reference signal sent by each base station.

In one embodiment, each base station may initially report the second positioning assistance data containing the third beam information of the third beam reference signal sent by the base station to the LMF entity; or each base station reports the second positioning assistance data containing the third beam information of the third beam reference signal sent by the base station to the LMF entity after receiving an assistance data request message sent by the LMF entity.

In one embodiment, the LMF entity issues an OTDOA information request message to each base station; and after receiving the OTDOA information request message, each base station reports the second positioning assistance data containing the third beam information of the third beam reference signal sent by the base station to the LMF entity through an OTDOA information response message.

Here, the third beam reference signal is a DL-RS used to support data communication and/or a PRS used to support positioning.

The third beam information includes some or all of: PRS beam identifier, PRS beam direction, PRS beam width, DL-RS beam identifier, DL-RS beam direction, DL-RS beam width, and Quasi Co-Located (QCL) association relationship between DL-RS beam and PRS beam.

In one embodiment, the second positioning assistance data contains the PRS information, where the PRS information contains the third beam information of the third beam reference signal. Furthermore, in addition to the third beam information of the third beam reference signal, the PRS information also contains other information which is the same as that in the prior art. The details can refer to the information in the "NRPPa OTDOA information response" message sent by the base station to the positioning server in the prior art, and will not be repeated here.

It should be noted here that the LMF entity receiving the second positioning assistance data reported by each base station and receiving the request message sent by the terminal are not ordered.

After receiving the second positioning assistance data reported by each base station and the request message sent by the terminal, the LMF entity determines the second beam information of the second beam reference signals sent by the adjacent base stations that can be detected by the terminal.

In one embodiment, the LMF entity determines the second beam information of the second beam reference signals sent by the adjacent base stations that can be detected by the terminal according to the first beam information of the first beam reference signal detected by the terminal contained in the request message and the second positioning assistance data.

It should be noted here that the second beam reference signals sent by the adjacent base stations that can be detected by the terminal determined by the LMF entity is the second beam reference signals sent by the adjacent base stations that is most likely to be detected theoretically by the terminal determined by the LMF entity; and the second beam reference signals sent by the adjacent base stations that can be detected by the terminal determined by the LMF entity may be the same as or different from the second beam reference signals sent by the adjacent base stations that can be actually detected by the terminal.

After determining the second beam information of the second beam reference signals sent by the adjacent base stations that can be detected by the terminal, the LMF entity sends the first positioning assistance data containing the second beam information of the second beam reference signals to the terminal; the second beam reference signals each is a PRS used to support positioning; and the second beam information includes the PRS beam identifier.

In one embodiment, the first positioning assistance data contains the PRS information, which contains the second beam information of the second beam reference signal; and furthermore, in addition to the second beam information of the second beam reference signal, the PRS information also contains other information which is the same as that in the prior art. The details can refer to the information in the "provide positioning assistance data" message sent by the positioning server to the terminal in the prior art, and will not be repeated here.

The method for the LMF entity to determine the second beam reference signals that can be detected by the terminal in an embodiment of the present application will be illustrated below with reference to FIG. 2.

Figure 2:
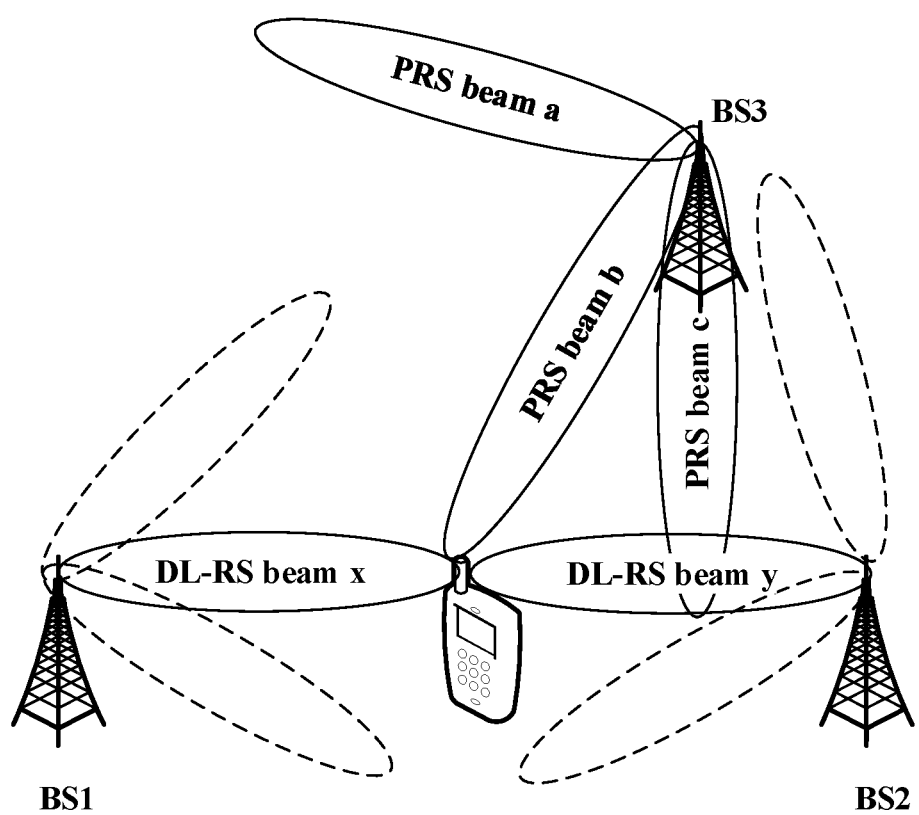
FIG. 2 is a schematic diagram of a method for determining second beam reference signals by an LMF entity according to embodiments of the present application.

As shown in FIG. 2, it is assumed that the terminal periodically measures the first beam reference signals from the serving base station and the adjacent base station, for example, measures the DL-RS to support the RRM, and determines that the DL-RS1 from the base station BS1 and the DL-RS from the base station BS2 have been detected according to the RRM measurement result; and the DL-RS1 from the base station BS1 is detected on the DL-RS beam x, and the DL-RS from the base station BS2 is detected on the DL-RS beam y. Then the terminal uses the DL-RS beam x, the DL-RS beam y, the signal strength(s) of DL-RS1 and/or DL-RS2 as the first beam information of the detected DL-RS, and sends the request message containing the first beam information to the LMF entity.

In addition, the LMF entity receives the second positioning assistance data containing the second beam information of the third beam reference signal reported by each base station; for example, the LMF entity receives the PRS from the base station BS3, and the PRS information contains the beam identifier of the BS3 and the direction, width, etc. of each beam.

The LMF entity determines that the terminal is located between the base station BS1 and the base station BS2 according to the beam information (DL-RS beam x, DL-RS beam y) carried in the request message. The LMF entity determines the beam of the base station BS3 sent to the area between the base station BS1 and the base station BS2 according to the PRS information containing the beam information reported by the base station, and for example, as shown in FIG. 2, the PRS beam b of the base station BS3 can be sent to the area between the base station BS1 and the base station BS2; the LMF entity uses the PRS from the base station BS3 sent to the area between the base station BS1 and the base station BS2 as the second beam reference signal, and adds the information of the PRS beam b to the PRS information of the second beam reference signals and sends it to the terminal.

Furthermore, the LMF entity can also determine the distance between the terminal and the base station sending the beam reference signal (PRS), and thus determine the time window for the terminal to search for the beam reference signal (PRS) beam, to reduce the time and power consumption of the terminal to search for the beam reference signal (PRS).

After receiving the first positioning assistance data sent by the LMF entity, the terminal may measure the second beam reference signals in the following ways.

In the first way, the LMF entity triggers the process.

The LMF entity sends a positioning request message to the terminal; and correspondingly, after receiving the positioning request message, the terminal measures the second beam reference signals of the adjacent base stations according to the first positioning assistance data.

In the second way, the terminal triggers the process.

The terminal initially reports the positioning information obtained by measuring the second beam reference signals of the adjacent base stations to the LMF entity.

In one embodiment, the terminal may measure the second beam reference signals immediately after receiving the first positioning assistance data sent by the LMF entity, or the terminal may measure the second beam reference signals at a preset moment.

In one embodiment, after measuring the second beam reference signals of the adjacent base stations according to the first positioning assistance data, the terminal determines the positioning information obtained by the measurement; and sends the positioning information and the second beam information of the second beam reference signals used for measurement to the LMF entity.

Correspondingly, the LMF entity receives the second beam information of the second beam reference signals used for measurement sent by the terminal, and determines the position of the terminal according to the positioning information and the second beam information of the second beam reference signals used for measurement.

Here, the positioning information may be a positioning measurement, and may be an RSTD measurement.

Figure 3:
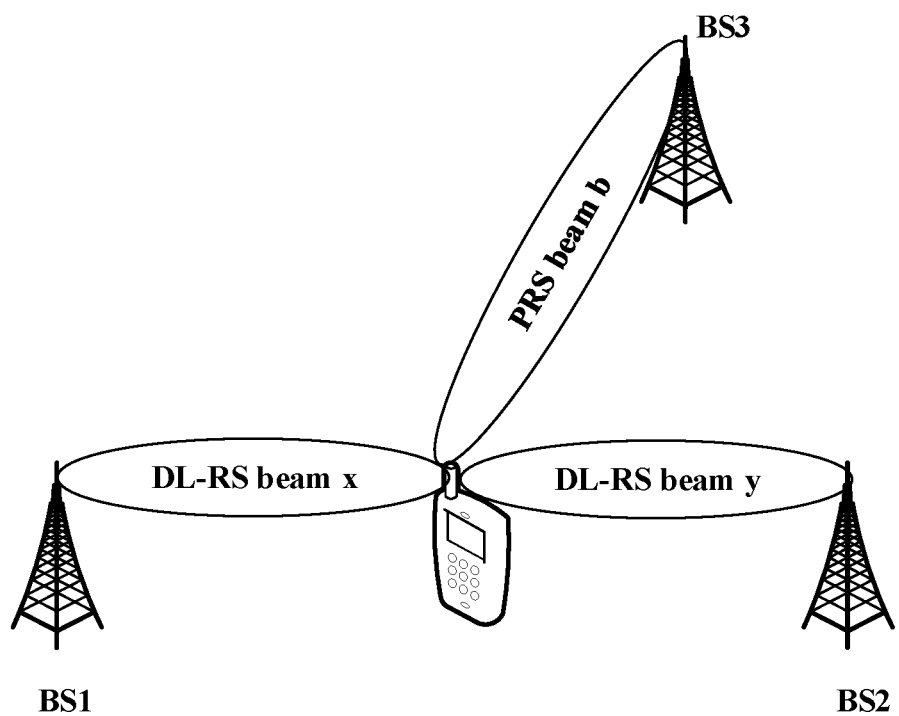
FIG. 3 is a schematic diagram of a method for locating a terminal by an LMF entity according to embodiments of the present application.

As shown in FIG. 3, it is assumed that the terminal obtains the RSTD measurement by measuring the PRS from the base station BS1, the PRS from the base station BS2 and the PRS from the base station BS3; and detects the PRS from the BS1 on the PRS beam x, detects the PRS from the BS2 on the PRS beam y, and detects the PRS from the BS3 on the PRS beam b, where the second beam information of the second beam reference signals used by the terminal for measurement includes the information of the PRS beam x, PRS beam y and PRS beam b; so the LMF entity determines the position of the terminal according to the RSTD measurement of the terminal and the information of the PRS beam x, PRS beam y and PRS beam b, to improve the OTDOA positioning accuracy and reliability.

Figure 4:
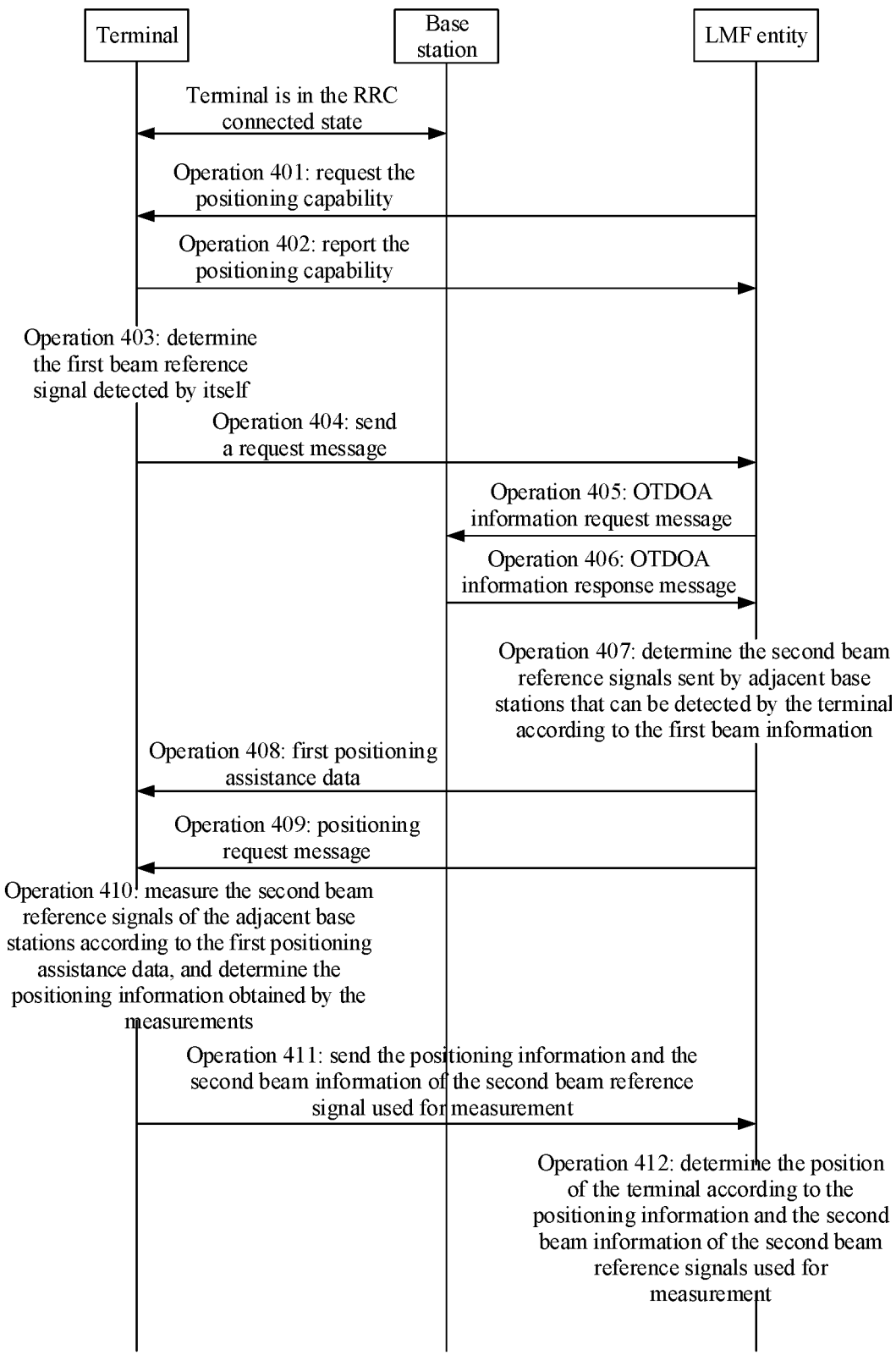
FIG. 4 is a flow chart of a first positioning method according to embodiments of the present application.

As shown in FIG. 4, it is a diagram of a first OTDOA positioning process of an embodiment of the present application.

Here, a terminal establishes a connection with a base station and is in the RRC connected state.

Operation 401: an LMF entity requests the positioning capability of the terminal. In operation 401, the LMF entity requests the terminal to report the positioning function that the terminal can support.

Operation 402: the terminal reports its positioning capability to the LMF entity. When the terminal reports the positioning capability to the LMF entity, it indicates that the terminal supports the NG-RAN OTDOA positioning capability.

Operation 403: the terminal determines the first beam reference signal detected by itself when the downlink positioning assistance data is needed, where the first beam reference signal is PRS and/or DL-RS.

Operation 404: the terminal sends a request message to the LMF entity, where the request message includes the first beam information of the first beam reference signal.

Operation 405: the LMF entity issues an OTDOA information request message to the base station.

Operation 406: the base station reports the second positioning assistance data containing the third beam information of the third beam reference signal sent by the base station to the LMF entity through an OTDOA information response message, where the third beam reference signal is PRS and/or DL-RS.

Operation 407: the LMF entity determines the second beam information of the second beam reference signals sent by adjacent base stations that can be detected by the terminal according to the first beam information, where the second beam reference signal is PRS.

Operation 408: the LMF entity sends the first positioning assistance data containing the second beam information of the second beam reference signals to the terminal.

Operation 409: the LMF entity sends a positioning request message to the terminal.

Operation 410: the terminal measures the second beam reference signals of the adjacent base stations according to the first positioning assistance data, and determines the positioning information obtained by the measurement, where the positioning information may be RSTD measurement value.

Operation 411: the terminal sends the positioning information and the second beam information of the second beam reference signals used for measurement to the LMF entity.

Operation 412: the LMF entity determines the position of the terminal according to the positioning information and the second beam information of the second beam reference signals used for measurement.

In the flowchart shown in FIG. 4, the operations 401-404 and operations 405-406 do not distinguish the order. It is possible to perform the operations 401-404 before the operations 405-406; or perform the operations 405-406 before the operations 401-404; or perform the operations 401-404 and operations 405-406 simultaneously.

It should be noted that the method in which the LMF entity triggers the terminal to perform the measurement is used in the above positioning process shown in FIG. 4. In addition, embodiments of the present application further provide a method in which the terminal triggers the measurement in the positioning process. The details refer to the positioning process shown in FIG. 5.

Figure 5:
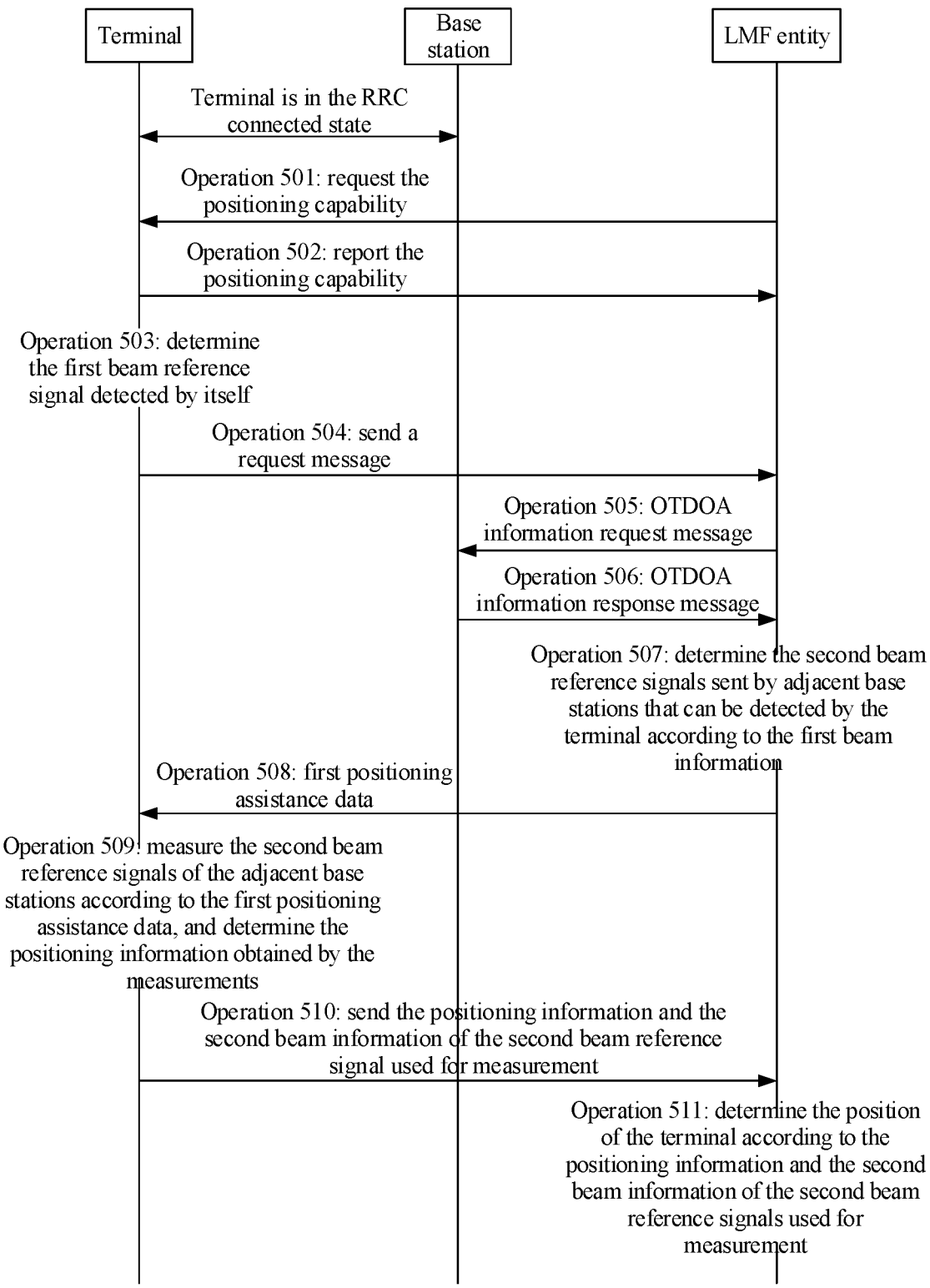
FIG. 5 is a flow chart of a second positioning method according to embodiments of the present application.

As shown in FIG. 5, it is a diagram of a second OTDOA positioning process of an embodiment of the present application. Here, a terminal establishes a connection with a base station and is in the RRC connected state.

Operation 501: an LMF entity requests the positioning capability of the terminal. In operation 501, the LMF entity requests the terminal to report the positioning function that the terminal can support.

Operation 502: the terminal reports its positioning capability to the LMF entity. When the terminal reports the positioning capability to the LMF entity, it indicates that the terminal supports the NG-RAN OTDOA positioning capability.

Operation 503: the terminal determines the first beam reference signal detected by itself when the downlink positioning assistance data is needed, where the first beam reference signal is PRS and/or DL-RS.

Operation 504: the terminal sends a request message to the LMF entity, where the request message includes the first beam information of the first beam reference signal.

Operation 505: the LMF entity issues an OTDOA information request message to the base station.

Operation 506: the base station reports the second positioning assistance data containing the third beam information of the third beam reference signal sent by the base station to the LMF entity through an OTDOA information response message, where the third beam reference signal is PRS and/or DL-RS.

Operation 507: the LMF entity determines the second beam information of the second beam reference signals sent by adjacent base stations that can be detected by the terminal according to the first beam information. Here, the second beam reference signal is PRS.

Operation 508: the LMF entity sends the first positioning assistance data containing the second beam information of the second beam reference signals to the terminal.

Operation 509: the terminal measures the second beam reference signals of the adjacent base stations according to the first positioning assistance data, and determines the positioning information obtained by the measurement, where the positioning information may be an RSTD measurement value.

Operation 510: the terminal sends the positioning information and the second beam information of the second beam reference signals used for measurement to the LMF entity.

Operation 511: the LMF entity determines the position of the terminal according to the positioning information and the second beam information of the second beam reference signals used for measurement.

It should be noted that, in the embodiments of the present application, when the terminal communicates with the LMF entity, the data is forwarded through the access network node (e.g., base station) and Access and Mobility Management Function (AMF) entity; for example, when the terminal sends a request message containing the first beam information of the first beam reference signal to the LMF entity, the terminal sends the request message to the serving base station, the serving base station forwards the request message to the AMF entity, and then the AMF entity forwards the request message to the LMF entity.

Figure 6:
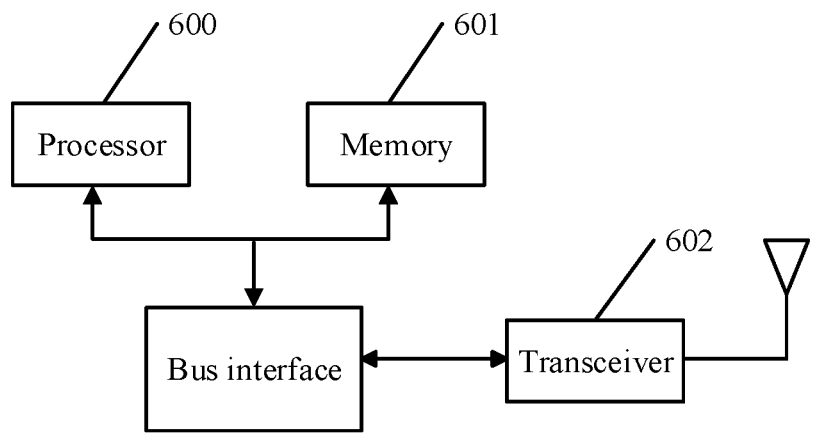
FIG. 6 is a structural schematic diagram of a first terminal according to embodiments of the present application.

As shown in FIG. 6, a first terminal of an embodiment of the present application includes: a processor 600, a memory 601, a transceiver 602 and a bus interface.

The processor 600 is responsible for managing the bus architecture and general processing, and the memory 601 may store the data used by the processor 600 when performing the operations. The transceiver 603 is configured to receive and send the data under the control of the processor 600.

The bus architecture may include any numbers of interconnected buses and bridges, and link various circuits of one or more processors represented by the processor 600 and the memory represented by the memory 601. The bus architecture may further link various other circuits such as peripheral device, voltage regulator and power management circuit, which are all well known in the art and thus will not be further described again herein. The bus interface provides an interface. The processor 600 is responsible for managing the bus architecture and general processing, and the memory 601 may store the data used by the processor 600 when performing the operations.

The procedure disclosed by the embodiment of the present application may be applied in the processor 600 or implemented by the processor 600. In the implementation process, each operation of the signal processing flow may be completed by the integrated logic circuit of hardware in the processor 600 or the instruction in the form of software. The processor 600 may be a general-purpose processor, a digital signal processor, an application specific integrated circuit, a field programmable gate array or other programmable logic device, a discrete gate or transistor logic device, or a discrete hardware component, and may implement or perform each method, operation and logical block diagram disclosed in the embodiments of the present application. The general-purpose processor may be a microprocessor or any conventional processor or the like. The operations of the method disclosed in combination with the embodiments of the present application may be directly completed by a hardware processor, or completed by a combination of hardware and software devices in the processor. The software devices may be located in the random access memory, flash memory, read only memory, programmable read only memory or electrically erasable programmable read only memory, register and other mature storage medium in the art. The storage medium is located in the memory 601, and the processor 600 reads the information in the memory 601 and completes the operations of the signal processing flow in combination with its hardware.

In one embodiment, the processor 600 is configured to read a program in the memory 601 and perform: determining a first beam reference signal detected by said terminal, and sending a request message to a Location Management Function, LMF, entity, and the request message contains first beam information of the first beam reference signal, to allow the LMF entity to determine second beam information of second beam reference signals according to the first beam information, the second beam reference signals being sent from adjacent base stations and detectable by the terminal; receiving first positioning assistance data containing the second beam information sent by the LMF entity; and measuring the second beam reference signals from the adjacent base stations according to the first positioning assistance data.

In one embodiment, the first beam reference signal is a beam communication Reference Signal (DL-RS) used to support data communication and/or a beam PRS used to support positioning; and the second beam reference signals each is a PRS used to support positioning.

In one embodiment, the first beam information includes some or all of: a DL-RS beam identifier, DL-RS signal strength, a PRS beam identifier.

In one embodiment, the second beam information includes a PRS beam identifier.

In one embodiment, the processor 600 is further configured to perform: determining the positioning information obtained by measurements after measuring the second beam reference signals of the adjacent base stations according to the first positioning assistance data; and send the positioning information and the second beam information of the second beam reference signals used for measurement to the LMF entity, to allow the LMF entity to determine a position of the terminal according to the positioning information and the second beam information of the second beam reference signals used for measurement.

In one embodiment, the processor 600 is configured to perform: determining the first beam reference signal detected by itself when it needs to acquire the first positioning assistance data.

In one embodiment, the processor 600 is further configured to perform: receiving a positioning request message sent by the LMF entity after receiving the first positioning assistance data containing the second beam information of the second beam reference signals sent by the LMF entity and before measuring the second beam reference signals of the adjacent base stations according to the first positioning assistance data.

Figure 7:
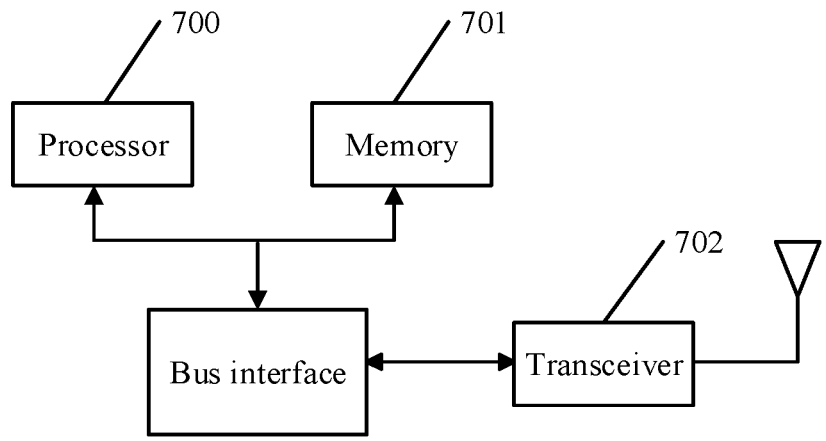
FIG. 7 is a structural schematic diagram of a first LMF entity according to embodiments of the present application.

As shown in FIG. 7, a first LMF entity of an embodiment of the present application includes a processor 700, a memory 701 and a transceiver 702.

The processor 700 is responsible for managing the bus architecture and general processing, and the memory 701 may store the data used by the processor 700 when performing the operations. The transceiver 702 is configured to receive and send the data under the control of the processor 700.

The bus architecture may include any numbers of interconnected buses and bridges, and link various circuits of one or more processors represented by the processor 700 and the memory represented by the memory 701. The bus architecture may further link various other circuits such as peripheral device, voltage regulator and power management circuit, which are all well known in the art and thus will not be further described again herein. The bus interface provides an interface. The processor 700 is responsible for managing the bus architecture and general processing, and the memory 701 may store the data used by the processor 700 when performing the operations.

The procedure disclosed by the embodiment of the present application may be applied in the processor 700 or implemented by the processor 700. In the implementation process, each operation of the signal processing flow may be completed by the integrated logic circuit of hardware in the processor 700 or the instruction in the form of software. The processor 700 may be a general-purpose processor, a digital signal processor, an application specific integrated circuit, a field programmable gate array or other programmable logic device, a discrete gate or transistor logic device, or a discrete hardware component, and may implement or perform each method, operation and logical block diagram disclosed in the embodiments of the present application. The general-purpose processor may be a microprocessor or any conventional processor or the like. The operations of the method disclosed in combination with the embodiments of the present application may be directly completed by a hardware processor, or completed by a combination of hardware and software devices in the processor. The software devices may be located in the random access memory, flash memory, read only memory, programmable read only memory or electrically erasable programmable read only memory, register and other mature storage medium in the art. The storage medium is located in the memory 701, and the processor 700 reads the information in the memory 701 and completes the operations of the signal processing flow in combination with its hardware.

In one embodiment, the processor 700 is configured to read a program in the memory 701 and perform: receiving a request message sent by a terminal; and the request message contains the first beam information of a first beam reference signal detected by the terminal; determining second beam information of second beam reference signals according to the first beam information, the second beam reference signals being sent from adjacent base stations and detectable by the terminal; and send the first positioning assistance data containing the second beam information to the terminal, to allow the terminal to measure the second beam reference signals of the adjacent base stations according to the first positioning assistance data.

In one embodiment, the processor 700 is further configured to perform: receiving the positioning information sent by the terminal, and determining a position of the terminal according to the positioning information; and the positioning information is obtained by the terminal through measuring the second beam reference signals of the adjacent base stations according to the first positioning assistance data.

In one embodiment, the processor 700 is further configured to perform: receiving the second positioning assistance data that is reported by each base station and contains the third beam information of a third beam reference signal sent by the base station before determining the second beam reference signals sent by the adjacent base stations that can be detected by the terminal.

In one embodiment, the processor 700 is configured to perform: determining the second beam information of the second beam reference signals sent by the adjacent base stations that can be detected by the terminal according to the first beam information of the first beam reference signal detected by the terminal contained in the request message and the second positioning assistance data.

In one embodiment, the first beam reference signal is a beam communication Reference Signal (DL-RS) used to support data communication and/or a beam PRS used to support positioning; and the second beam reference signal is a beam PRS used to support positioning.

In one embodiment, the third beam reference signal is a DL-RS used to support data communication and/or a PRS used to support positioning.

In one embodiment, the first beam information includes some or all of: a DL-RS beam identifier, DL-RS signal strength, a PRS beam identifier.

In one embodiment, the second beam information includes a PRS beam identifier.

In one embodiment, the third beam information includes some or all of: a PRS beam identifier, a PRS beam direction, a PRS beam width, a DL-RS beam identifier, a DL-RS beam direction, a DL-RS beam width, and a QCL association relationship between DL-RS beam and PRS beam.

In one embodiment, the processor 700 is further configured to perform: receiving the second beam information of the second beam reference signals used for measurement sent by the terminal; and the processor is configured to perform: determining the position of the terminal according to the positioning information and the second beam information of the second beam reference signals used for measurement.

Figure 8:
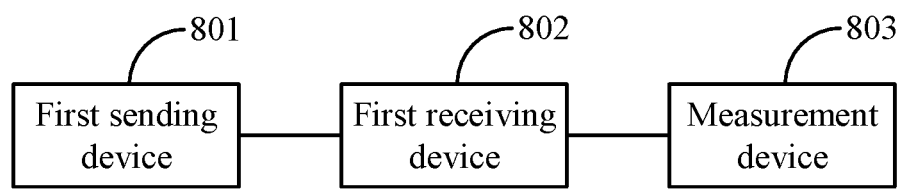
FIG. 8 is a structural schematic diagram of a second terminal according to embodiments of the present application.

As shown in FIG. 8, a second terminal of embodiments of the present application includes:

a first sending device 801 configured for determining a first beam reference signal detected by said terminal, and sending a request message to a Location Management Function, LMF, entity, and the request message contains first beam information of the first beam reference signal, to allow the LMF entity to determine second beam information of second beam reference signals according to the first beam information, the second beam reference signals being sent from adjacent base stations and detectable by the terminal;

a first receiving device 802 configured for receiving first positioning assistance data containing the second beam information sent by the LMF entity;

a measurement device 803 configured for measuring the second beam reference signals of the adjacent base stations according to the first positioning assistance data.

In one embodiment, the first beam reference signal is a beam communication Reference Signal (DL-RS) used to support data communication and/or a beam PRS used to support positioning; and the second beam reference signals each is a PRS used to support positioning.

In one embodiment, the first beam information includes some or all of: a DL-RS beam identifier, DL-RS signal strength, a PRS beam identifier.

In one embodiment, the second beam information includes a PRS beam identifier.

In one embodiment, the measurement device 803 is further configured for: determining the positioning information obtained by measurements after measuring the second beam reference signals of the adjacent base stations according to the first positioning assistance data; and sending the positioning information and the second beam information of the second beam reference signals used for measurement to the LMF entity, to allow the LMF entity to determine a position of the terminal according to the positioning information and the second beam information of the second beam reference signals used for measurement.

In one embodiment, the first sending device 801 is configured for: determining the first beam reference signal detected by itself when it needs to acquire the first positioning assistance data.

In one embodiment, the first receiving device 802 is further configured for: receiving a positioning request message sent by the LMF entity after receiving the first positioning assistance data containing the second beam information of the second beam reference signals sent by the LMF entity and before measuring the second beam reference signals of the adjacent base stations according to the first positioning assistance data.

Figure 9:
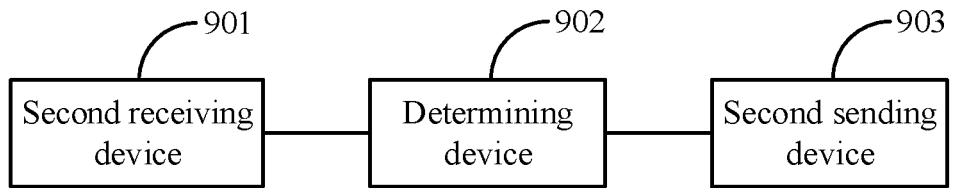
FIG. 9 is a structural schematic diagram of a second LMF entity according to embodiments of the present application.

As shown in FIG. 9, a second LMF entity of embodiments of the present application includes:

a second receiving device 901 configured for receiving a request message sent by a terminal; where the request message contains the first beam information of a first beam reference signal detected by the terminal;

a determining device 902 configured for determining the second beam information of second beam reference signals according to the first beam information, the second beam reference signals being sent by adjacent base stations and detectable by the terminal;

a second sending device 903 configured for sending the first positioning assistance data containing the second beam information to the terminal, to allow the terminal to measure the second beam reference signals of the adjacent base stations according to the first positioning assistance data.

In one embodiment, the second sending device 903 is further configured for: receiving the positioning information sent by the terminal, and determining a position of the terminal according to the positioning information; where the positioning information is obtained by the terminal through measuring the second beam reference signals of the adjacent base stations according to the first positioning assistance data.

In one embodiment, the determining device 902 is further configured for: receiving the second positioning assistance data that is reported by each base station and contains the third beam information of a third beam reference signal sent by each base station before determining the second beam reference signals sent by the adjacent base stations and detectable by the terminal.

In one embodiment, the determining device 902 is configured for: determining the second beam information of the second beam reference signals sent by the adjacent base stations and detectable by the terminal according to the first beam information of the first beam reference signal detected by the terminal contained in the request message and the second positioning assistance data.

In one embodiment, the first beam reference signal is a beam communication Reference Signal (DL-RS) used to support data communication and/or a beam PRS used to support positioning; and the second beam reference signals each is a PRS used to support positioning.

In one embodiment, the third beam reference signal is a DL-RS used to support data communication and/or a PRS used to support positioning.

In one embodiment, the first beam information includes some or all of: a DL-RS beam identifier, DL-RS signal strength, a PRS beam identifier.

In one embodiment, the second beam information includes a PRS beam identifier.

In one embodiment, the third beam information includes some or all of: a PRS beam identifier, a PRS beam direction, a PRS beam width, a DL-RS beam identifier, a DL-RS beam direction, a DL-RS beam width, and a QCL association relationship between DL-RS beam and PRS beam.

In one embodiment, the second sending device 903 is further configured for: receiving the second beam information of the second beam reference signals used for measurement sent by the terminal; and the second sending device 903 is configured for: determining the position of the terminal according to the positioning information and the second beam information of the second beam reference signals used for measurement.

An embodiment of the present application further provides a computer storable medium storing a computer program thereon, where the program, when executed by a processor, implements the operations of the method of the terminal side described above or implements the operations of the method of the LMF entity side described above.

Based on the same inventive concept, an embodiment of the present application further provides a measurement method. Since this method corresponds to the method of the terminal side in the measurement system of the embodiments of the present application and the principle of the method to solve the problem is similar to that of the system, the implementations of this method can refer to the implementations of the system, and the repeated description thereof will be omitted here.

Figure 10:
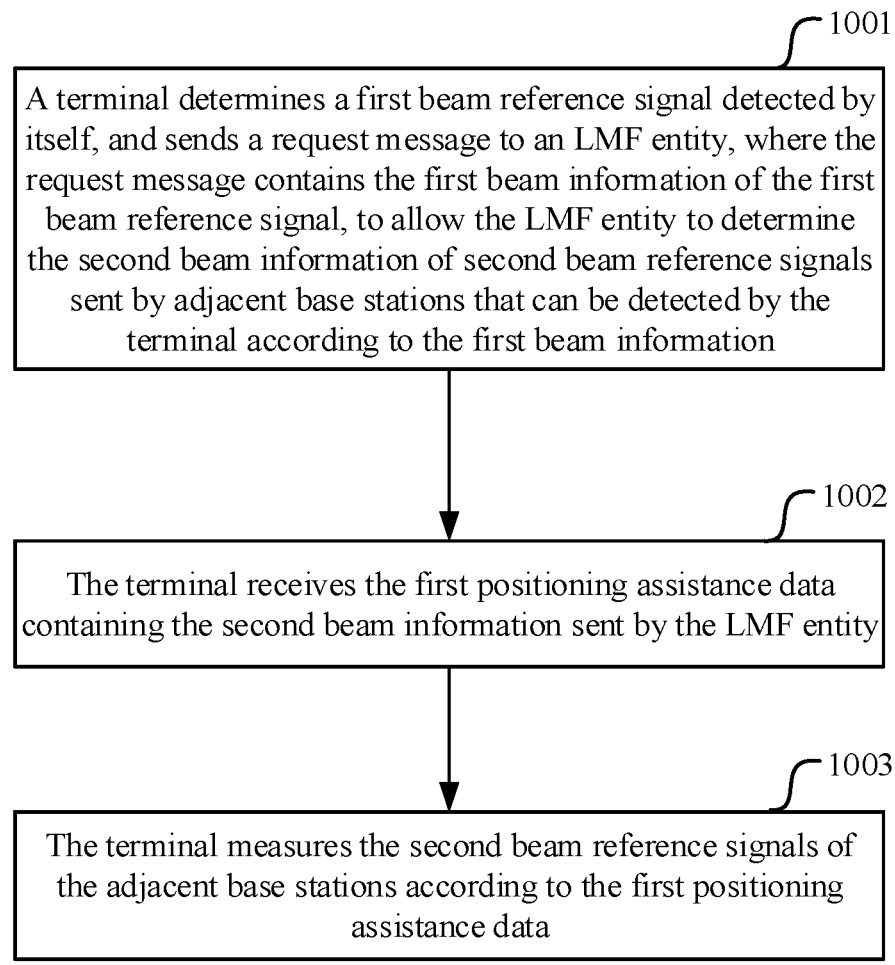
FIG. 10 is a flowchart of a first measurement method according to embodiments of the present application.

As shown in FIG. 10, a measurement method of embodiments of the present application includes:

operation 1001: a terminal determines a first beam reference signal detected by itself, and sends a request message to an LMF entity, and the request message contains the first beam information of the first beam reference signal, to allow the LMF entity to determine the second beam information of second beam reference signals sent by adjacent base stations and detectable by the terminal according to the first beam information;

operation 1002: the terminal receives the first positioning assistance data containing the second beam information sent by the LMF entity;

operation 1003: the terminal measures the second beam reference signals of the adjacent base stations according to the first positioning assistance data.

In one embodiment, the first beam reference signal is a beam communication Reference Signal (DL-RS) used to support data communication and/or a beam PRS used to support positioning; and the second beam reference signals each is a PRS used to support positioning.

In one embodiment, the first beam information includes some or all of: a DL-RS beam identifier, DL-RS signal strength, a PRS beam identifier.

In one embodiment, the second beam information includes a PRS beam identifier.

In one embodiment, after the terminal measures the second beam reference signals of the adjacent base stations according to the first positioning assistance data, the method further includes: determining, by the terminal, positioning information obtained by measurements; and sending, by the terminal, the positioning information and the second beam information of the second beam reference signals used for measurement to the LMF entity, to allow the LMF entity to determine a position of the terminal according to the positioning information and the second beam information of the second beam reference signals used for measurement.

In one embodiment, determining, by the terminal, a first beam reference signal detected by itself, includes: determining, by the terminal, the first beam reference signal detected by itself when it needs to acquire the first positioning assistance data.

In one embodiment, after the terminal receives the first positioning assistance data containing the second beam information of the second beam reference signals sent by the LMF entity, and before the terminal measures the second beam reference signals of the adjacent base stations according to the first positioning assistance data, the method further includes: receiving, by the terminal, a positioning request message sent by the LMF entity.

Based on the same inventive concept, embodiments of the present application further provide a measurement method. Since this method corresponds to the method performed by the LMF entity in the measurement system of the embodiments of the present application and the principle of the method to solve the problem is similar to that of the system, the implementations of this method can refer to the implementations of the system, and the repeated description thereof will be omitted here.

Figure 11:
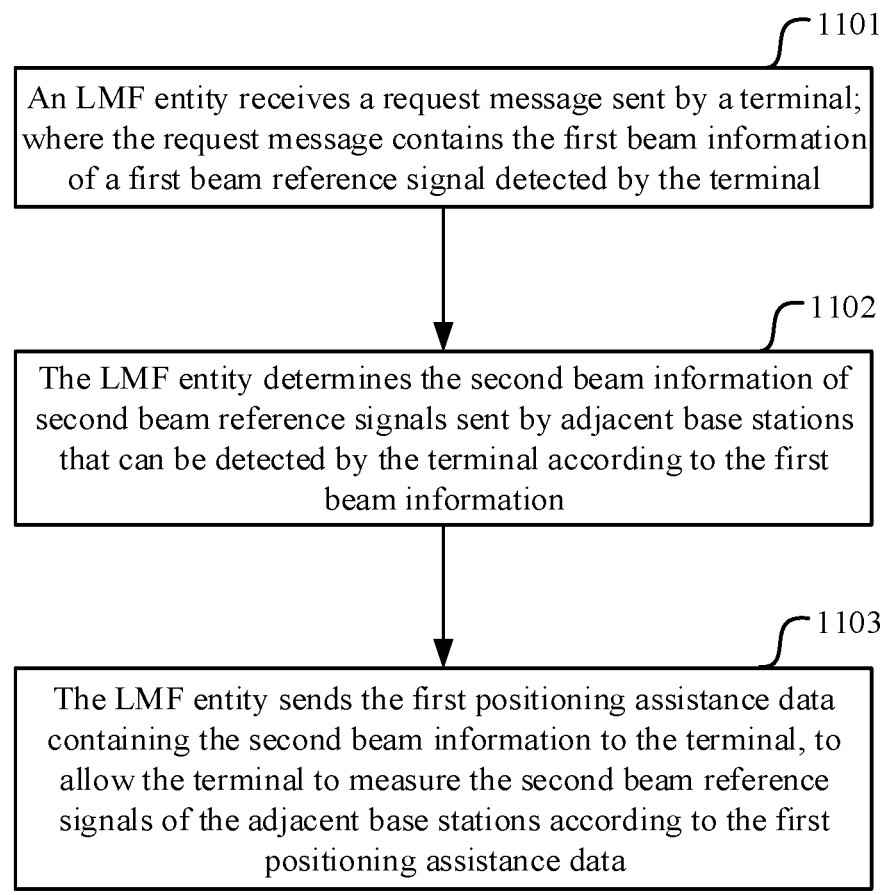
FIG. 11 is a flowchart of a second measurement method according to embodiments of the present application.

As shown in FIG. 11, an embodiment of the present application provides a measurement method, which includes:

operation 1101: an LMF entity receives a request message sent by a terminal; where the request message contains the first beam information of a first beam reference signal detected by the terminal;

operation 1102: the LMF entity determines the second beam information of second beam reference signals according to the first beam information, the second beam reference signals being sent by adjacent base stations and detectable by the terminal;

operation 1103: the LMF entity sends the first positioning assistance data containing the second beam information to the terminal, to allow the terminal to measure the second beam reference signals of the adjacent base stations according to the first positioning assistance data.

In one embodiment, after the LMF entity sends the first positioning assistance data containing the second beam information to the terminal, the method further includes: receiving, by the LMF entity, positioning information sent by the terminal, and determining a position of the terminal according to the positioning information; and the positioning information is obtained by the terminal through measuring the second beam reference signals of the adjacent base stations according to the first positioning assistance data.

In one embodiment, before the LMF entity determines the second beam reference signals sent by the adjacent base stations that can be detected by the terminal, the method further includes: receiving, by the LMF entity, second positioning assistance data that is reported by each base station and contains third beam information of a third beam reference signal sent by each base station.

In one embodiment, determining, by the LMF entity, second beam information of second beam reference signals sent by adjacent base stations that can be detected by the terminal, includes: determining, by the LMF entity, the second beam information of the second beam reference signals sent by the adjacent base stations that can be detected by the terminal according to the first beam information of the first beam reference signal detected by the terminal contained in the request message and the second positioning assistance data.

In one embodiment, the first beam reference signal is a beam communication Reference Signal (DL-RS) used to support data communication and/or a beam PRS used to support positioning; and the second beam reference signals each is a PRS used to support positioning.

In one embodiment, the third beam reference signal is a DL-RS used to support data communication and/or a PRS used to support positioning.

In one embodiment, the first beam information includes some or all of: a DL-RS beam identifier, DL-RS signal strength, a PRS beam identifier.

In one embodiment, the second beam information includes a PRS beam identifier.

In one embodiment, the third beam information includes some or all of: a PRS beam identifier, a PRS beam direction, a PRS beam width, a DL-RS beam identifier, a DL-RS beam direction, a DL-RS beam width, and a QCL association relationship between DL-RS beam and PRS beam.

In one embodiment, the method further includes: receiving, by the LMF entity, the second beam information of the second beam reference signals used for measurement sent by the terminal; and determining, by the LMF entity, a position of the terminal according to the positioning information, includes: determining, by the LMF entity, the position of the terminal according to the positioning information and the second beam information of the second beam reference signals used for measurement.

The present application has been described above by reference to the block diagrams and/or flow charts showing the methods, devices (systems) and/or computer program products according to the embodiments of the present application. It should be understood that one block shown in the block diagrams and/or flow charts and a combination of the blocks shown in the block diagrams and/or flow charts can be implemented by the computer program instructions. These computer program instructions can be provided to a general-purpose computer, a processor of a dedicated computer and/or another programmable data processing unit to produce a machine, so that the instructions executed by the computer processor and/or another programmable data processing unit create the methods for implementing the functions and/or actions specified in the blocks of the block diagrams and/or flow charts.

Accordingly, the present application can also be implemented by the hardware and/or software (including the firmware, resident software, microcode and the like). Further, the present application can adopt the form of computer program products on the computer usable or computer readable storage medium, which has the computer usable or computer readable program codes implemented in the medium, to be used by the instruction execution system or used in combination with the instruction execution system. In the context of the present application, the computer usable or computer readable storage medium can be any medium, which can contain, store, communicate with, transmit or transfer the programs, to be used by the instruction execution system, apparatus or device, or used in combination with the instruction execution system, apparatus or device.

What is claimed is:

1. A measurement method, comprising:
   determining, by a terminal, a first beam reference signal detected by said terminal, and sending a request message to a Location Management Function, LMF, entity, wherein the request message contains first beam information of the first beam reference signal, to allow the LMF entity to determine second beam information of second beam reference signals according to the first beam information, the second beam reference signals being sent from adjacent base stations and detectable by the terminal;

receiving, by the terminal, first positioning assistance data containing the second beam information sent by the LMF entity; and measuring, by the terminal, the second beam reference signals from the adjacent base stations according to the first positioning assistance data.

2. The method of claim 1, wherein the first beam reference signal is a Downlink Reference Signal, DL-RS, used to support data communication and/or a Positioning Reference Signal, PRS, used to support positioning;

the second beam reference signals each is a PRS used to support positioning.

3. The method of claim 2, wherein the first beam information comprises a part or all of:

a DL-RS beam identifier, DL-RS signal strength, a PRS beam identifier.

4. The method of claim 2, wherein the second beam information comprises a PRS beam identifier.

5. The method of claim 1, wherein after the terminal measures the second beam reference signals from the adjacent base stations according to the first positioning assistance data, the method further comprises:

determining, by the terminal, positioning information obtained by measurements; and sending, by the terminal, the positioning information and the second beam information of the second beam reference signals used for measurement to the LMF entity, to allow the LMF entity to determine a position of the terminal according to the positioning information and the second beam information of the second beam reference signals used for measurement.

6. The method of claim 1, wherein determining, by the terminal, a first beam reference signal detected by said terminal, comprises:

determining, by the terminal, the first beam reference signal detected by said terminal when said terminal needs to acquire the first positioning assistance data.

7. The method of claim 1, wherein after the terminal receives the first positioning assistance data containing the second beam information of the second beam reference signals sent by the LMF entity, and before the terminal measures the second beam reference signals from the adjacent base stations according to the first positioning assistance data, the method further comprises:

receiving, by the terminal, a positioning request message sent by the LMF entity.

8. A measurement method, comprising:

receiving, by an LMF entity, a request message sent by a terminal; wherein the request message contains first beam information of a first beam reference signal detected by the terminal;

determining, by the LMF entity, second beam information of second beam reference signals according to the first beam information, the second beam reference signals being sent from adjacent base stations and detectable by the terminal; and sending, by the LMF entity, first positioning assistance data containing the second beam information to the terminal, to allow the terminal to measure the second beam reference signals from the adjacent base stations according to the first positioning assistance data.

9. The method of claim 8, wherein after the LMF entity sends the first positioning assistance data containing the second beam information to the terminal, the method further comprises:

receiving, by the LMF entity, positioning information sent from the terminal, and determining a position of the terminal according to the positioning information; wherein the positioning information is obtained by the terminal through measuring the second beam reference signals of the adjacent base stations according to the first positioning assistance data.

10. The method of claim 9, further comprising:

receiving, by the LMF entity, the second beam information of the second beam reference signals used for measurement sent by the terminal;

determining, by the LMF entity, a position of the terminal according to the positioning information, comprises:

determining, by the LMF entity, the position of the terminal according to the positioning information and the second beam information of the second beam reference signals used for measurement.

11. The method of claim 8, wherein before the LMF entity determines the second beam reference signals sent from the adjacent base stations and detectable by the terminal, the method further comprises:

receiving, by the LMF entity, second positioning assistance data reported by each base station and contains third beam information of a third beam reference signal sent by the each base station.

12. The method of claim 11, wherein determining, by the LMF entity, second beam information of second beam reference signals sent by adjacent base stations and detectable by the terminal, comprises:

determining, by the LMF entity, the second beam information of the second beam reference signals sent by the adjacent base stations and detectable by the terminal according to the first beam information of the first beam reference signal detected by the terminal contained in the request message and the second positioning assistance data.

13. The method of claim 11, wherein the third beam reference signal is a DL-RS used to support data communication and/or a PRS used to support positioning.

14. The method of claim 13, wherein the third beam information comprises part or all of:

PRS beam identifier, PRS beam direction, PRS beam width, DL-RS beam identifier, DL-RS beam direction, DL-RS beam width, and Quasi Co Located, QCL, association relationship between DL-RS beam and PRS beam.

15. The method of claim 8, wherein the first beam reference signal is a beam communication Reference Signal, DL-RS, used to support data communication and/or a beam Positioning Reference Signal, PRS, used to support positioning;

the second beam reference signals each is a beam PRS used to support positioning.

16. The method of claim 15, wherein the first beam information comprises part or all of:

DL-RS beam identifier, DL-RS signal strength, PRS beam identifier.

17. The method of claim 15, wherein the second beam information comprises a PRS beam identifier.

18. A terminal, comprising: a processor, a memory and a transceiver;

wherein the processor is configured to read a program in the memory and perform:

determining a first beam reference signal detected by said terminal, and sending a request message to a Location Management Function, LMF, entity, wherein the request message contains first beam information of the first beam reference signal, to allow the LMF entity to determine second beam information of second beam reference signals according to the first beam information, the second beam reference signals being sent from adjacent base stations and detectable by the terminal;

receiving first positioning assistance data containing the second beam information sent by the LMF entity; and measuring the second beam reference signals from the adjacent base stations according to the first positioning assistance data.

19. An LMF entity, comprising: a processor, a memory and a transceiver;

wherein the processor is configured to read a program in the memory and perform the method of claim 8.

* * * * *